(12) United States Patent
Sheldon et al.

(10) Patent No.: US 11,654,986 B2
(45) Date of Patent: May 23, 2023

(54) COMPOUND DOWEL FOR POSITIONING COMPONENTS IN VEHICLE STRUCTURES

(71) Applicant: GM GLOBAL TECHNOLOGY OPERATIONS LLC, Detroit, MI (US)

(72) Inventors: Mark M. Sheldon, Shelby Township, MI (US); Rudy M. Vican, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 17/097,524

(22) Filed: Nov. 13, 2020

(65) Prior Publication Data

US 2022/0153367 A1    May 19, 2022

(51) Int. Cl.
*B62D 65/02* (2006.01)
*B62D 65/14* (2006.01)
*B33Y 80/00* (2015.01)

(52) U.S. Cl.
CPC ........... *B62D 65/024* (2013.01); *B62D 65/14* (2013.01); *B33Y 80/00* (2014.12)

(58) Field of Classification Search
CPC ....... B62D 65/024; B62D 65/14; B33Y 80/00
See application file for complete search history.

(56) References Cited

U.S. PATENT DOCUMENTS

2020/0096027 A1* 3/2020 Mongeau ................ F16B 5/025

* cited by examiner

*Primary Examiner* — Rick K Chang
(74) *Attorney, Agent, or Firm* — Quinn IP Law

(57) ABSTRACT

A compound dowel for positioning a first component defining a first aperture relative to a second component defining a second aperture in a motor vehicle body structure in response to a determined misalignment between the first and second components includes a compensation pin. The compensation pin is selected in response to the determined misalignment and configured to be inserted into the second aperture. The compensation pin has a center axis and an indexing feature configured to orient and fix the compensation pin to the first component. The compound dowel also includes a nominal pin arranged parallel to the center axis and offset therefrom by a distance. The nominal pin is configured to be inserted through the first aperture, such that position of the first component is set relative to the second component. A method of positioning components in a vehicle body structure using a compound dowel is also considered.

17 Claims, 5 Drawing Sheets

COMPOUND DOWEL FOR POSITIONING COMPONENTS IN VEHICLE STRUCTURES

INTRODUCTION

The present disclosure relates to a system and a method for positioning components in a motor vehicle in response to vehicle body structure dimensional variation.

Typically, a vehicle includes a body structure for enclosing and supporting various vehicle systems, as well as the vehicle passengers. Heavy-duty vehicles, such as pick-up trucks and cargo vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain.

Frequently, additional sub-structures are used to buttress the vehicle body structure, as well as for supporting various chassis and powertrain subsystems. Also, auxiliary sub-structures and support members may be used for mounting various vehicle interior components. Positioning precision and fit of such sub-structures and support members are generally influenced by stack-up of tolerances in the vehicle's main body structure. Mounting variation of vehicle powertrain and suspension components may affect distribution of loads across the vehicle structure, the vehicle's noise vibration and harshness (NVH) characteristics, as well as its driving dynamics, while precision and fit of vehicle interior components may affect general perception of the vehicle's build quality.

SUMMARY

A method of positioning components in a body structure of a motor vehicle includes determining a misalignment between a first aperture defined by a first component and a second aperture defined by a second component. The method also includes selecting, in response to the determined misalignment, a compensation pin having a center axis and an indexing feature. The method additionally includes inserting a nominal pin through the first aperture, wherein the nominal pin is parallel to the center axis and shifted therefrom by an offset distance. The method also includes orienting and fixing the compensation pin to the first component via the indexing feature. The method further includes inserting the compensation pin into the second aperture, thereby setting position of the first component relative to the second component.

The first component may also define at least one fastener aperture and the second component includes a respective at least one fastener feature. Additionally, each fastener aperture and fastener feature may be configured to accept an individual fastener. In such an embodiment, the method may further include attaching the first component to the second component via fastener(s) at the at least one fastener aperture and the respective at least one fastener feature.

The nominal pin may be integral with the compensation pin and extend from a common surface with the indexing feature.

The compensation pin may alternatively define a passage arranged parallel to the center axis and shifted therefrom by the offset distance. Additionally, the nominal pin may be separate from the compensation pin. In such an embodiment, the method may include inserting the nominal pin into the passage of the compensation pin prior to inserting the compensation pin into the second aperture.

Selecting the compensation pin may include generating, in real time, the compensation pin via additive manufacturing.

Generating the compensation pin may include 3D-printing the compensation pin from one of nylon, polypropylene, and powdered metal.

Selecting the compensation pin may include correlating or cross-referencing the determined misalignment with the offset distance via an electronic database.

The compensation pin indexing feature may include a plurality of snap-in prongs and the first component may additionally define a corresponding plurality of third apertures configured to accept the snap-in prongs. In such an embodiment, orienting and fixing the compensation pin may include engaging and locking the plurality of snap-in prongs with the corresponding plurality of third apertures.

The plurality of snap-in prongs may specifically include three snap-in prongs.

The compensation pin may include a lead-in feature configured to facilitate insertion of the compensation pin into the second aperture.

Determining the misalignment may be accomplished via an optical scan.

Alternatively, determining the misalignment may be accomplished via a contact probe.

A vehicle body structure using such a component positioning method and a compound dowel employed in the vehicle body structure are also disclosed. The compound dowel may be used to adjust position of the first component in multiple planes with respect to the second component. In the disclosed vehicle body structure, the first component may be a bulkhead, while the second component may be an instrument panel cross-member.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
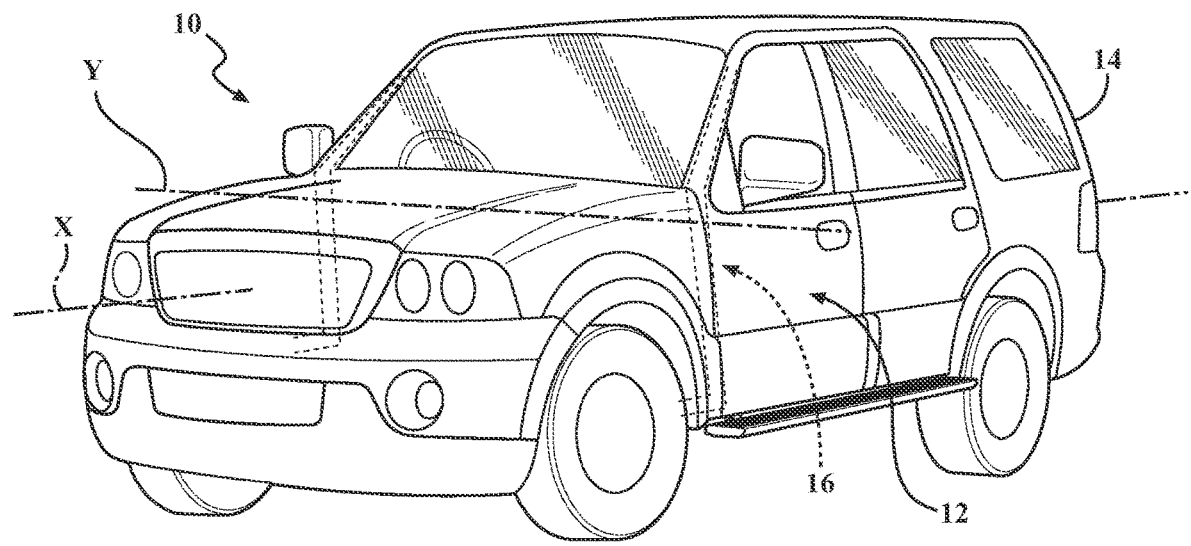
FIG. 1 is a schematic perspective view of a vehicle having a vehicle body structure.

Referring to the drawings, wherein like reference numbers refer to like components, FIG. 1 shows a perspective schematic outline of a vehicle 10 having a vehicle body structure 12. The vehicle body structure 12 is made up of a vehicle body 14 constructed from a number of components, such as exterior body panels (not shown), sub-structures, and a frame 16. The vehicle body 14 is characterized by a longitudinal vehicle centerline that generally coincides with an X-axis and is orthogonal to a Y-axis (shown in FIG. 1). The vehicle body 14 is attached to the frame 16, thus enabling a support structure for a vehicle suspension (not shown) and wheels, while also supporting vehicle subsystems, such as a steering system, a powertrain, passengers, and cargo (not shown). As shown, the frame 16 is arranged in the general plane of the vehicle 10, substantially defined by the X and Y axes.

Figure 2:
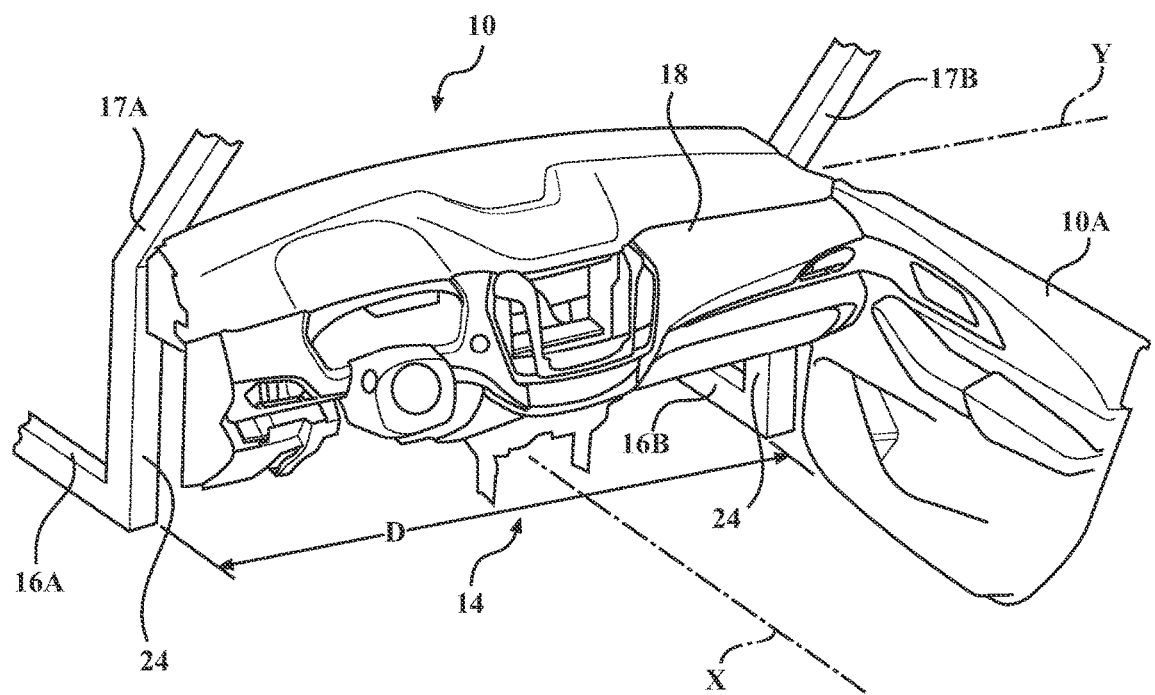
FIG. 2 is a schematic partial perspective view of the vehicle shown in FIG. 1, depicting an instrument panel mounted relative to the vehicle body structure having symmetrically positioned bulkheads fixed to vehicle frame rails.

As shown in FIG. 2, the frame 16 includes two frame rails, 16A and 16B, separated in the vehicle body structure 12 by a distance D. The frame rails 16A and 16B may be substantially parallel with respect to each other, e.g., within +/−5° of true parallel. As shown, the frame rails 16A, 16B may be configured as partial rails that exclude the dashed line sections, thereby defining an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add a relatively little strength or stiffness. Similar to the unibody structure, a semi-monocoque construction is an integrated structure employing ribs, bulkheads, and box sections to reinforce the vehicle body, while the outer body panels bear a smaller portion of the structural load.

The first and second frame rails 16A, 16B are arranged substantially symmetrically with respect to the X-axis or the longitudinal vehicle centerline. As used herein, the term "substantially symmetrically" may denote a positioning of specified components that is within +/−5 cm of true symmetry with respect to the X-axis, which represents at least part of the manufacturing tolerance built into the vehicle body structure 12. Frame rails 16A and 16B may be constructed from aluminum, and be formed by one or more appropriate methods, such as extrusion, hydro-forming, roll-forming, stamping, and welding. The vehicle body structure 12 also includes sub-structures 17A and 17B. As shown, the first and second frame rails 16A, 16B and sub-structures 17A and 17B may be part of a unibody or semi-monocoque structure in a generally light-duty passenger vehicle. Alternatively, an appropriately modified version of the first and second frame rails 16A, 16B with sub-structures 17A, 17B fastened thereto, as appreciated by those skilled in the art, may be used in a heavy-duty passenger vehicle, such as a pick-up truck or a cargo van. As shown in FIG. 1, the vehicle 10 includes an instrument panel 18 configured to house vehicle gauges and controls, such as for a heating, ventilation, and air conditioning (HVAC) and infotainment systems.

With continued reference to FIG. 2, the vehicle body structure 12 includes an instrument panel cross-member 22. The instrument panel cross-member 22 is configured to support individual components, such as gauges and controls of the instrument panel 18, is arranged orthogonal with respect to the X-axis, i.e., generally along the Y-axis. As may be seen in FIG. 2, the vehicle body structure 12 includes two bulkheads 24, one on each side of and symmetrically positioned relative to the longitudinal centerline of the vehicle body 14, which may be load-bearing components in either a unibody or a semi-monocoque construction. As shown, the two bulkheads 24 are individually fixed to the frame rails 16A and 16B at one end, and to the sub-structures 17A and 17B, respectively, at another end. The bulkheads 24 may be joined, for example laser welded, to the respective frame rails 16A, 16B and to the sub-structures 17A, 17B. As a result, thus interconnected bulkheads 24, frame rails 16A, 16B, and sub-structures 17A, 17B may facilitate a high strength and stiffness section of the vehicle body structure 12. The instrument panel cross-member 22 is attached to each of the bulkheads 24 at a first end 22-1 and a second end 22-2.

In general, vehicle body structure 12 may include a number of subassemblies of first and second components, such as the instrument panel cross-member 22 attached to the bulkheads 24. Accordingly, within the context of the present disclosure, and in the interest of abstraction, the instrument panel cross-member 22 may be considered a first component, while each of the bulkheads 24 may be considered a second component, wherein the first and second components are intended to be put together in a resultant subassembly. While majority of the present disclosure will focus on the instrument panel cross-member 22 and the bulkheads 24, for example, the first component may be an interior trim component, while the second component may be a separate door trim assembly or structure that has previously been attached to the vehicle body structure 12. Overall, the first and second components may be vehicle sub-systems or features configured to be joined together and between which manufacturing tolerances and assembly variation need to be minimized.

Figure 4:
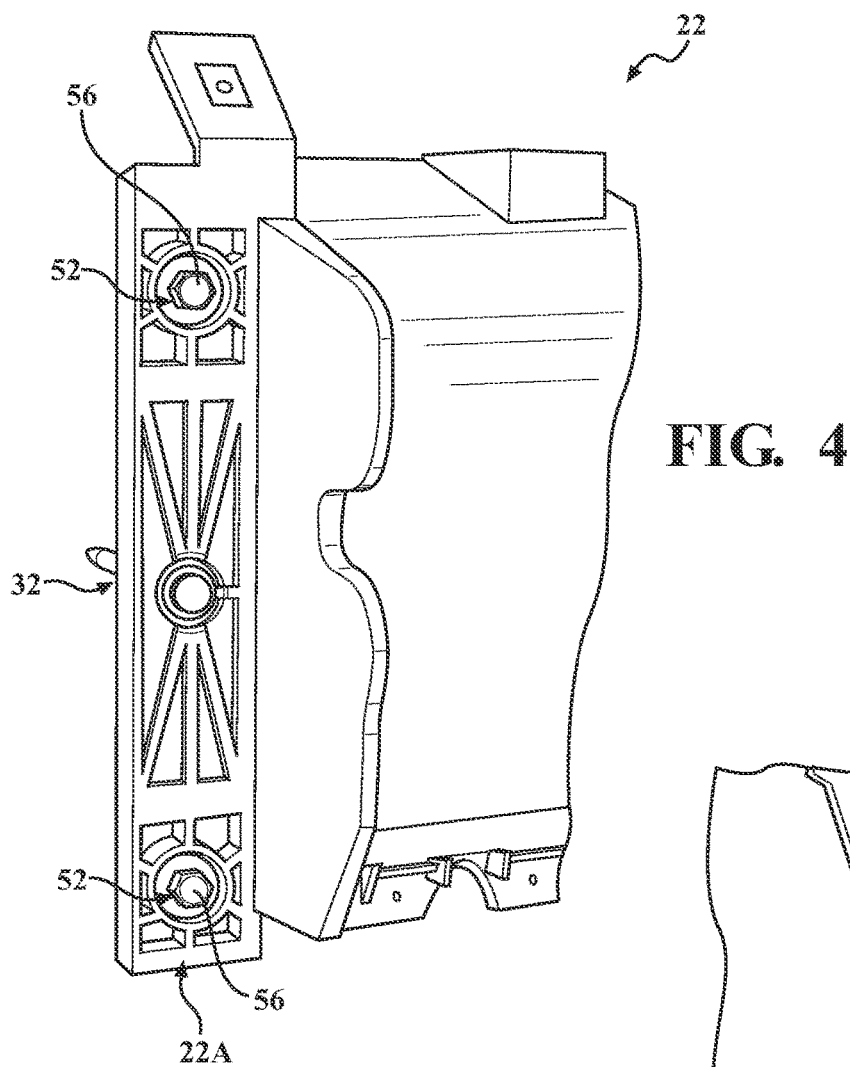
FIG. 4 is a schematic close-up partial perspective view of the instrument panel cross-member depicted in FIG. 2, particularly depicting a front face of a mounting flange and a compound dowel using a compensation pin for positioning the instrument panel cross-member with respect to the bulkheads, according to the disclosure.
Figure 5:
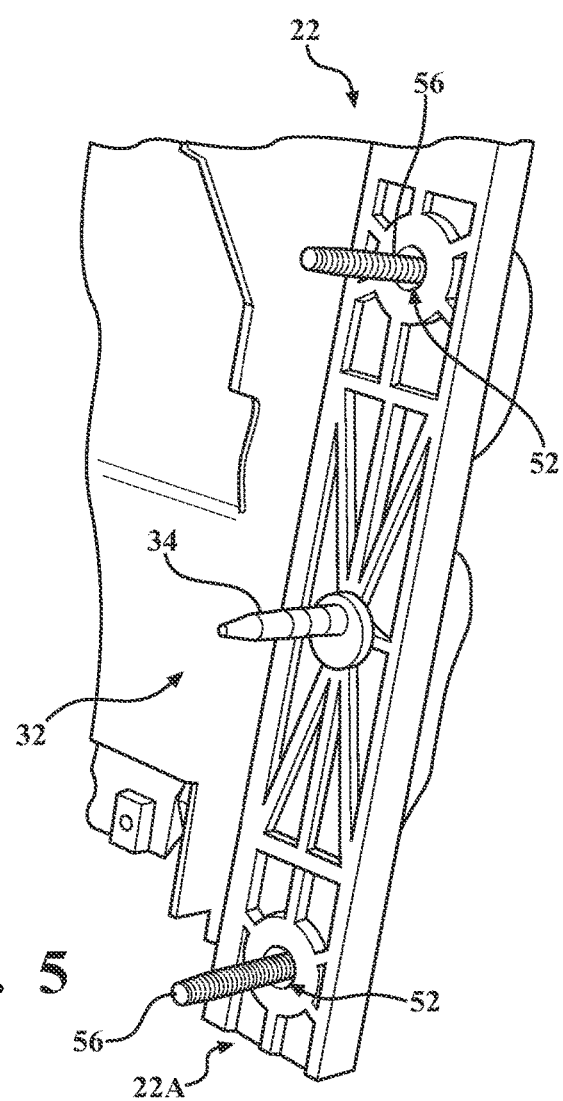
FIG. 5 is a schematic close-up partial perspective view of a backside of the mounting flange and the compound dowel shown in FIG. 4.
Figure 6:
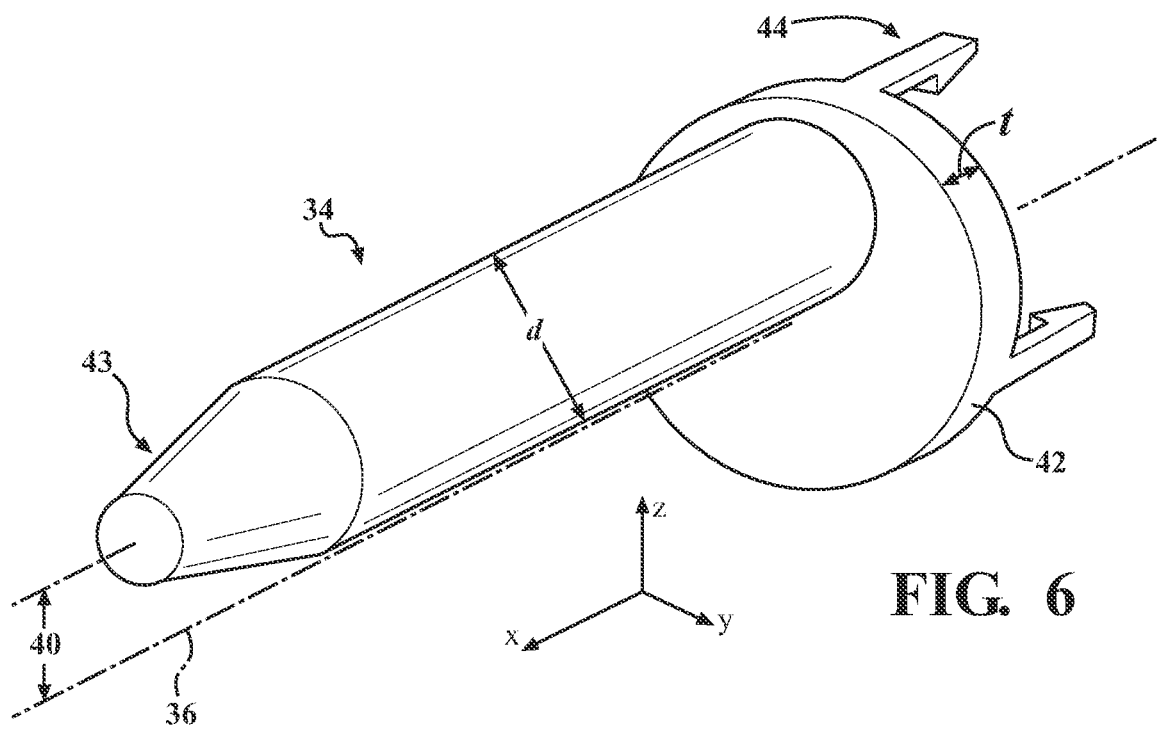
FIG. 6 is a schematic close-up perspective view of the compensation pin shown in FIGS. 4 and 5.
Figure 7:
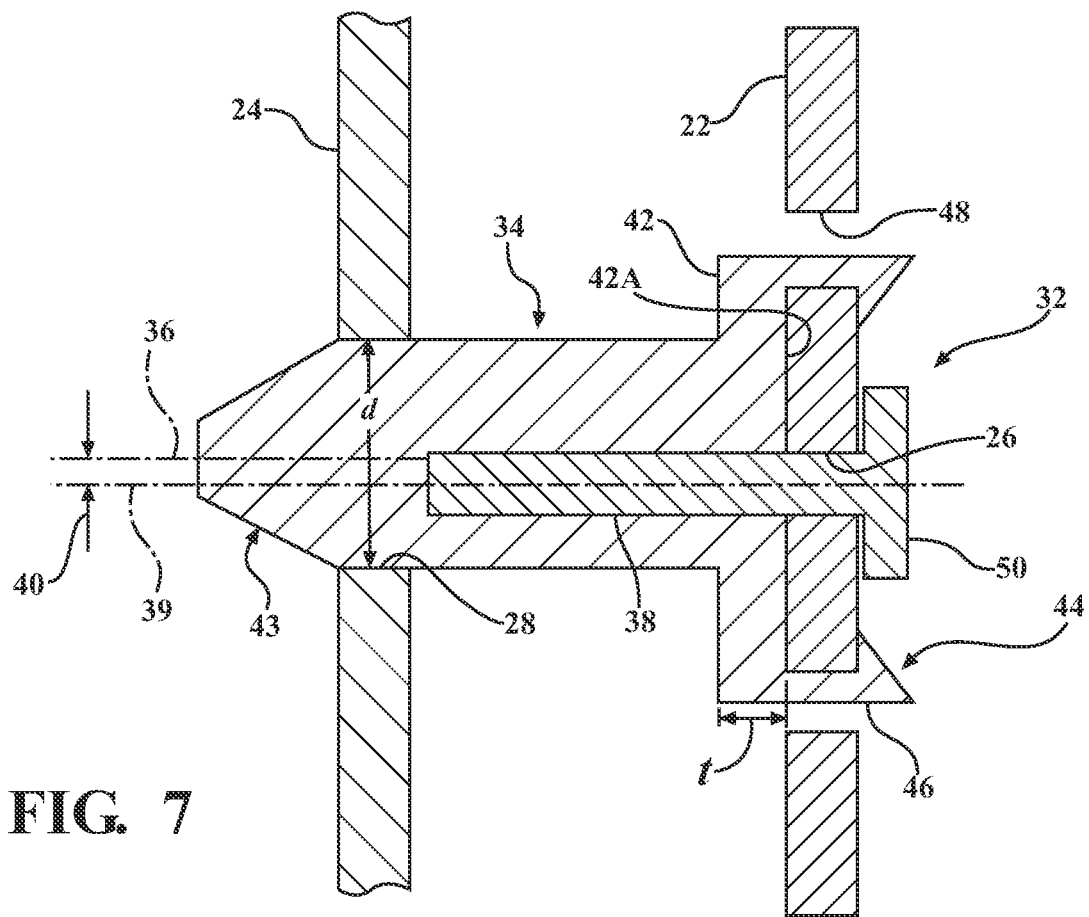
FIG. 7 is a cross-sectional view of the compound dowel shown in FIGS. 4 and 5, including an embodiment of the compensation pin and a separate nominal pin engaged therewith.
Figure 8:
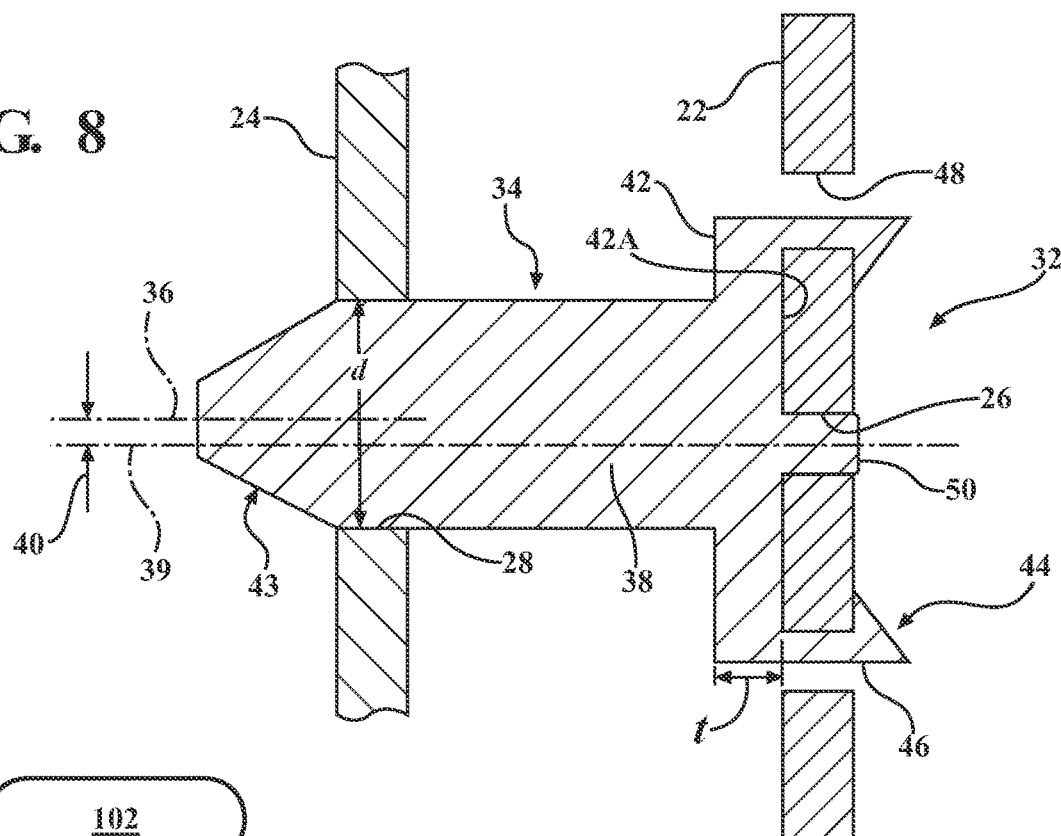
FIG. 8 is a cross-sectional view of the compound dowel shown in FIGS. 4 and 5, including an embodiment of the compensation pin having an integral nominal pin.

As may be seen in FIGS. 7 and 8, each first component, such as the panel cross-member 22, defines a first aperture 26 at each end 22-1 and 22-2, while the second component, such as each of the bulkheads 24, defines a second aperture 28. The first aperture 26 and the second aperture 28 are intended to be aligned such that the first and second components may be fastened together in the finished vehicle body structure 12. Due to manufacturing tolerances inherent in fabricated components, when installed and arranged in preparation for final assembly, a misalignment may result between the first aperture 26 and the second aperture 28. As will be described in detail below, actual misalignment may be determined during assembly of the vehicle body structure 12 via an optical scan or a contact probe. To address the misalignment, a compound dowel 32 (shown in FIGS. 4-8) is employed for positioning the second component relative to the first component and thus fixing the second aperture 28 with respect to the first aperture 26. As shown in FIG. 5, the compound dowel 32 includes a compensation pin 34, specifically selected in response to the determined misalignment and configured to be inserted into the second aperture 28.

With reference to FIG. 6, the compensation pin 34 a pin body diameter d and a center axis 36. The pin body diameter d is intended to fit into the second aperture 28 and provide connection between the first and second components. As shown, the compensation pin may define a passage 38 arranged along a passage axis 39. The passage axis 39 parallel to and shifted from the center axis 36 by a specifically defined offset distance 40. The offset distance 40 of the passage 38 from the center axis 36 may be expressly selected to position the first component relative to the second component in the Y-Z plane. As such, the offset distance 40 compensates for the misalignment between the first and second apertures 26, 28.

The compensation pin 34 also has a cap 42 (shown in FIG. 6) including a surface 42A and defined by a cap thickness t. The cap thickness t may be selected to position the first component relative to the second component along the X axis. Accordingly, a particular offset distance 40 along with a particular pin body diameter d and/or cap thickness t in a specific compensation pin 34 may be used to facilitate adjustment of the first component relative to the second component in either one or a combination of the X, Y, and Z axes. In other words, selection of the offset distance 40 of passage axis 39, diameter d of the pin body, and the thickness t of cap 42 provides the compensation pin 34 with sufficient degree of freedom to shift of the mounting of the first component with respect to the second component in each of the X-Z and Y-Z planes.

As shown in FIGS. 6 and 7, the compensation pin 34 may include a lead-in feature 43, such as a tapered or rounded nose, arranged opposite the cap 42. The lead-in feature 43 is intended to facilitate insertion of the compensation pin into the second aperture 28. In other words, the tapered or rounded nose 43 is configured to ease assembly of the first component, such as the panel cross-member 22, with the second component, such as the either one of the bulkheads 24. As shown in FIG. 7, the compensation pin 34 also includes an indexing feature 44 extending from the cap surface 42A. The indexing feature 44 is configured to orient and fix the compensation pin to the first component, such as the panel cross-member 22. The indexing feature 44 may include a plurality of snap-in prongs 46. As shown in FIGS. 4 and 5, the first component, such as the panel cross-member 22, has a mounting flange 22A. The mounting flange 22A defines a plurality of third apertures 48 corresponding to and configured to accept the plurality of snap-in prongs 46.

The snap-in prongs 46 are configured to engage the mounting flange 22A and become captured at the third apertures 48. Accordingly, the compensation pin 34 may be oriented and fixed by engagement and locking of the plurality of snap-in prongs 46 within the corresponding third apertures 48. Specifically, the compensation pin 34 may include two or three snap-in prongs 46 and a corresponding number of third apertures 48 defined by the first component. Although not shown, the cap 42 may have an outer diameter that extends past the third apertures 48. Such an enlarged diameter cap 42 may enhance stability of the compensation pin 34 during its insertion into the second aperture 28 defined by the second component.

As will be described in detail below, the compensation pin 34 may be selected by a human operator or a piece of automated assembly machinery from a supply of existing, previously generated pins providing a range of passage 38 offsets and indexing features 44. The compensation pin 34 may be selected via a determined correlation, i.e., cross-referencing, of the determined misalignment with the offset distance 40 of the passage 38 and indexing features 44 using an electronic processor with access to an electronic database. Such a process is intended to facilitate selection of a premade compensation pin 34 having the distance 40 of the pin's offset closest to the determined misalignment. Alternatively, the compensation pin 34 may be generated in real time via additive manufacturing, for example 3D-printed from a suitable material such as nylon, polypropylene, or powdered metal in response to the determined misalignment. Such a compensation pin 34, whether selected from a premade collection of pins or a pin generated in real time, may be installed into the first component by a human operator or preprogrammed, automated equipment.

As shown in FIG. 7, the compound dowel 32 having the passage 38 is intended to additionally include a nominal pin 50 configured, e.g., sized and formed, for insertion through the first aperture 26 and into the passage 38 of the compensation pin 34. In the present embodiment, the nominal pin 50 is separate from the compensation pin 34, i.e., the nominal pin and the compensation pin are individual, separate, and detached parts prior to the insertion of the nominal pin into the passage 38. The nominal pin 50 may be inserted into the passage 38 of the compensation pin 34 prior to or simultaneously with the insertion of the compensation pin into the second aperture 28. The nominal pin 50 of FIG. 7 may be constructed or formed from metal, such as aluminum or steel, or an engineered plastic. Insertion of the subject nominal pin 50 through the first aperture 26 and into the passage 38 is intended to set position of the first component relative to the second component and prepare the first and second components to be fastened together.

Alternatively, as shown in FIG. 8, the nominal pin 50 may be integral or unitary with the compensation pin 34. In such an embodiment, the nominal pin 50 extends from a common surface of the cap 42 with the indexing feature 44, i.e., the surface 42A. In the present embodiment, the nominal pin 50 is inserted the into the second aperture 28 substantially synchronously with the insertion of the indexing feature 44 into the third apertures 48 during engagement of the compound dowel 32 with the first component. The nominal pin 50 shown in FIG. 8 is constructed from the same material as the compensation pin 34. The nominal pin 50 may extend beyond the farthest point of the indexing feature 44, such that the nominal pin engages the first aperture 26 prior to the first component's contact with the indexing feature (not shown). Analogous to the embodiment of FIG. 7, the insertion of the nominal pin 50 of FIG. 8 through into the first aperture 26 is intended to set position of the first component relative to the second component and prepare the first and second components to be fastened together.

The first component may additionally define one or more fastener apertures 52 (shown in FIGS. 3-5) and the second component may include respective one or more fastener features 54 (shown in FIG. 3), for example weld nuts or formed threads. Each fastener aperture 52 and fastener feature 54 may be configured to accept a fastener 56 (shown in FIGS. 3-5). In the vehicle body structure 12 depicted in FIG. 3, the first component is attached to the second component, such as the instrument panel cross-member 22 to the bulkheads 24, via fastener(s) 56 at the respective fastener apertures 52 and the respective fastener features 54.

An appropriate compensation pin 34 may be selected for each of the first and second ends 22-1, 22-2 of the instrument panel cross-member 22. Each compensation pin 34 is generated with a respective passage 38 having a particular offset distance 40 to position the instrument panel cross-member 22 in the vehicle body structure 12. Such use of the compensation pins 34 may permit improved fit of instrument panel 18 in the vehicle 10. Consequently, the fit of the instrument panel 18 inside the vehicle 10 may facilitate enhanced perception of the vehicle's build quality. For example, the fit of the instrument panel 18 may be used to balance visible gaps between the instrument panel and adjacent trim panels, such as mounted on the vehicle doors 10A (shown in FIG. 2), and/or be used to adjust the height of the instrument panel relative to other features of the vehicle interior.

Figure 9:
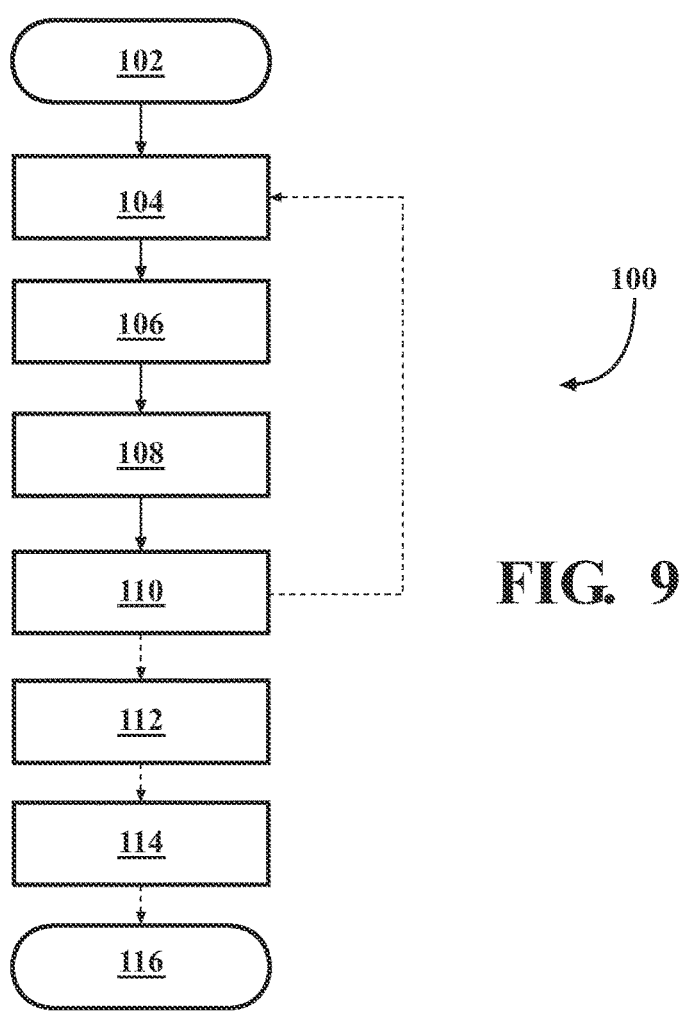
FIG. 9 is a flow diagram of a method of positioning components in a body structure of a motor vehicle using determined misalignment between body structure components shown in FIGS. 1-8, according to the disclosure.

A method 100 of positioning first and second components, such as the instrument panel cross-member 22 and the bulkheads 24, respectively, is shown in FIG. 9 and described below with reference to the description of the vehicle body structure 12 shown in FIGS. 1-8. Method 100 commences in frame 102 with preassembling components of the vehicle body structure 12, such as the frame rails 16A, 16B, substructures 17A and 17B, together with the second components, such as the bulkheads 24. Following frame 102, the method advances to frame 104. In frame 104, the method includes determining a misalignment between the first aperture 26 defined by the first component and the second aperture 28 defined by the second component. For example, between the first aperture 26 at the first end 22-1 of the instrument panel cross-member 22 and the second aperture of the respective bulkhead 24.

Figure 3:
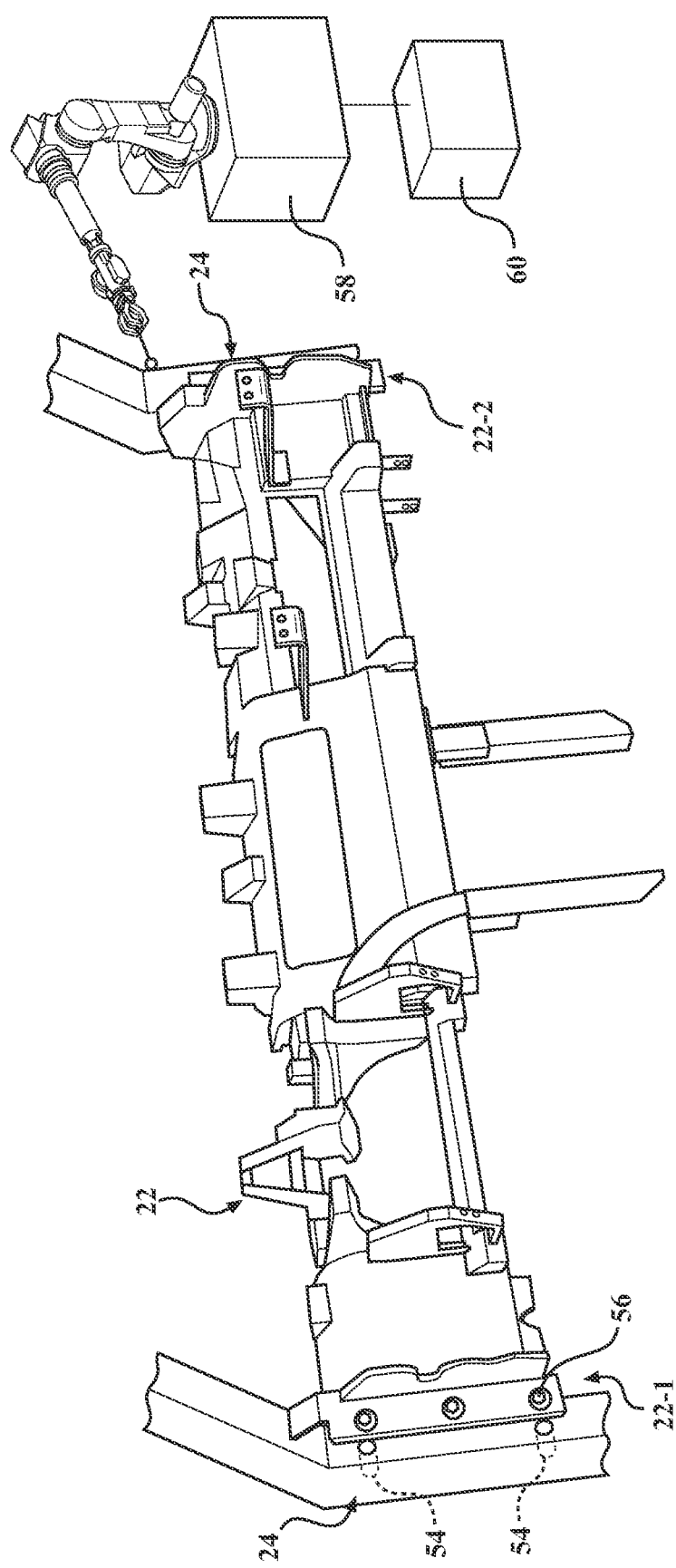
FIG. 3 is a schematic perspective view of an instrument panel cross-member configured to support the instrument panel shown in FIG. 2, according to the disclosure.

Specifically, determination of the misalignment between the first and second apertures 26, 28 may be accomplished via an optical, white light, or laser scan or a physical probe of a coordinate measuring machine (CMM) 58 shown in FIG. 3. Generally, a CMM is a device that measures the geometry of physical objects by sensing discrete points on the surface of the object with a probe. Various types of probes are used in CMMs, including mechanical, optical, laser, and white light. Depending on the machine, the probe position may be manually controlled by an operator or may be controlled automatically by a computer. CMMs typically specify a probe's position in terms of its displacement from a reference position in a three-dimensional Cartesian coordinate system (i.e., with respect to XYZ axes). Accordingly, a respective CMM may be programmed to locate the first and second apertures 26, 28 on the surfaces of the respective first and second components and correlate their relative locations to the subject misalignment.

After frame 104 the method proceeds to frame 106. In frame 106, the method includes selecting, in response to the determined misalignment, the compensation pin 34 having the indexing feature 44 and either defining the passage 38 arranged at the offset distance 40 or having the integral nominal pin 50. As described above with respect to FIGS. 1-8, the indexing feature 44 may include a plurality of snap-in prongs 46. As also noted above, the compensation pin 34 may be used to adjust position of the first component in multiple planes with respect to the second component. Selecting the compensation pin 34 may include generating, in real time, the compensation pin via additive manufacturing, such as 3D-printing. In such a case, a 3D printer 60 (shown in FIG. 3) may be in electronic communication with the CMIVI 58 for direct transfer of the determined misalignment data and rapid determination of the offset distance 40 for the passage 38 and orientation of the indexing feature 44. Specifically, the compensation pin 34 may be manufactured from an appropriate formable and tough material such as an engineered plastic, for example nylon or polypropylene, or a powdered metal, such as aluminum or steel. Alternatively, the compensation pin 34 may be selected using an electronic database programmed into a computer to assist correlating the determined misalignment with the offset distance 40 of the passage 38. As described above with respect to FIGS. 1-8, the database may facilitate selecting the compensation pin 34 from a supply or catalogue of existing, premade pins with the offset distance 40 closest to the determined misalignment.

From frame 106, the method moves on to frame 108. In frame 108 the method includes inserting the nominal pin 50 through the first aperture 26 and may then include inserting the nominal pin into the passage 38 of the compensation pin 34 shown in FIG. 7. From frame 108, the method advances to frame 110. In frame 110 the method may include orienting and fixing the compensation pin 34 to the first component via the indexing feature 44. The compensation pin 34 may be specifically oriented and fixed by engaging and locking the plurality of snap-in prongs 46 with the corresponding plurality of third apertures 48. Alternatively, the integral nominal pin 50 of the compensation pin 34 shown in FIG. 8 may be inserted through the first aperture 26 substantially simultaneously with orienting and fixing the compensation pin 34 to the first component via the indexing feature 44. After frame 110 the method proceeds to frame 112. In frame 112 the method includes inserting the compensation pin 34 into the second aperture 28, thereby setting position of the first component, such as the instrument panel cross-member 22 relative to the second component, such as the bulkheads 24, to minimize positional variation of the first and second components in the motor vehicle body structure 12. Insertion of the compensation pin 34 into the second aperture 28 may be facilitated by a lead-in feature of the compensation pin, such as the previously described lead-in feature 43.

As an alternative, following frame 110 the method may loop back to frame 104 for determining misalignment between the first aperture 26 at the second end 22-2 of the instrument panel cross-member 22 and the second aperture of the respective bulkhead 24 and then proceed through frame 112. Selection of appropriate compensation pins 34 at each of the first and second ends 22-1 and 22-2 of the instrument panel cross-member 22 may permit averaging of the respective misalignments. Such averaging of the respective misalignments may further facilitate balancing out of the respective left and right side gaps between the instrument panel and interior trim, such as subsequently assembled onto vehicle doors 10A, for enhanced perceived build quality of the vehicle 10. Following frame 112, the method may advance to frame 114. In frame 114 the method includes attaching the first component to the second component via fastener(s) 56 at the respective fastener aperture(s) 52 and the respective fastener feature(s) 54 at each of the first and second ends 22-1 and 22-2 of the instrument panel cross-member 22 to the respective bulkheads 24. Method 100 may conclude in frame 116 following frame 114 in preparation for continued assembly of the vehicle body structure 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of positioning components in a body structure of a motor vehicle comprising:
    determining a misalignment between a first aperture defined by a first component and a second aperture defined by a second component;
    selecting, in response to the determined misalignment, a compensation pin having a center axis, an indexing feature, and a lead-in feature configured to facilitate insertion of the compensation pin into the second aperture, wherein the indexing feature includes a plurality of snap-in prongs and the first component additionally defines a corresponding plurality of third apertures configured to accept the snap-in prongs, and wherein orienting and fixing the compensation pin includes engaging and locking the plurality of snap-in prongs with the corresponding plurality of third apertures;
    inserting a nominal pin through the first aperture, wherein the nominal pin is arranged on the compensation pin parallel to the center axis and is shifted from the center axis by an offset distance; orienting and fixing the compensation pin to the first component via the indexing feature; and
    inserting the compensation pin into the second aperture, thereby setting position of the first component relative to the second component.

2. The method according to claim 1, wherein the first component additionally defines at least one fastener aperture and the second component includes a respective at least one fastener feature, wherein each fastener aperture and fastener feature is configured to accept a fastener, the method further comprising attaching the first component to the second component via fastener(s) at the at least one fastener aperture and the respective at least one fastener feature.

3. The method according to claim 1, wherein the nominal pin is integral with the compensation pin and extends from a common surface with the indexing feature.

4. The method according to claim 1, wherein the compensation pin defines a passage arranged parallel to the center axis and shifted therefrom by the offset distance, and wherein the nominal pin is separate from the compensation pin, further comprising inserting the nominal pin into the passage of the compensation pin prior to inserting the compensation pin into the second aperture.

5. The method according to claim 1, wherein selecting the compensation pin includes generating, in real time, the compensation pin via additive manufacturing.

6. The method according to claim 5, wherein generating the compensation pin includes 3D-printing the compensation pin from one of nylon, polypropylene, and powdered metal.

7. The method according to claim 1, wherein selecting the compensation pin includes correlating the determined misalignment with the offset distance via an electronic database.

8. The method according to claim 1, wherein determining the misalignment is accomplished via an optical scan or a contact probe.

9. A body structure of a motor vehicle comprising:
    a first component defining a first aperture and a second component defining a second aperture, wherein a misalignment is generated between the first aperture and the second aperture;
    a nominal pin, parallel to the center axis and shifted therefrom by an offset distance, inserted through the first aperture, and
    a compensation pin, selected in response to the misalignment, having a center axis, an indexing feature, and a lead-in feature configured to facilitate insertion of the compensation pin into the second aperture, wherein the indexing feature includes a plurality of snap-in prongs and the first component additionally defines a corresponding plurality of third apertures configured to accept the snap-in prongs, and wherein the compensation pin is oriented and fixed by engagement and locking of the plurality of snap-in prongs with the corresponding plurality of third apertures;
    wherein the nominal pin is arranged on the compensation pin and the compensation pin is oriented and fixed to the first component via the indexing feature and inserted into the second aperture, such that the indexing feature and the offset distance compensate for the misalignment between the first and second apertures and position of the first component is set relative to the second component.

10. The body structure according to claim 9, wherein the first component additionally defines at least one fastener aperture and the second component includes a respective at least one fastener feature, wherein each fastener aperture and fastener feature is configured to accept a fastener, and wherein the first component is attached to the second component via fastener(s) at the at least one fastener aperture and the respective at least one fastener feature.

11. The body structure according to claim 9, wherein the nominal pin is integral with the compensation pin and extends from a common surface with the indexing feature.

12. The body structure according to claim 9, wherein the compensation pin defines a passage arranged parallel to the center axis and shifted therefrom by the offset distance, wherein the nominal pin is separate from the compensation pin, and wherein the nominal pin is inserted into the passage of the compensation pin.

13. A compound dowel for positioning a first component defining a first aperture relative to a second component defining a second aperture in a body structure of a motor vehicle in response to a determined misalignment between the first and second components, the compound dowel includes:
    a compensation pin, selected in response to the determined misalignment and configured to be inserted into the second aperture, having a center axis an indexing feature configured to orient and fix the compensation pin to the first component, and a lead-in feature configured to facilitate insertion of the compensation pin into the second aperture feature, wherein the lead-in feature includes a tapered outer end surface; and
    a nominal pin arranged on the compensation pin, parallel to the center axis, and offset therefrom by a distance, wherein the nominal pin is configured to be inserted through the first aperture, such that position of the first component is set relative to the second component.

14. The compound dowel according to claim 13, wherein the nominal pin is integral with the compensation pin and extends from a common surface with the indexing feature.

15. The compound dowel according to claim 13, wherein the compensation pin defines a passage arranged parallel to the center axis and shifted therefrom by the offset distance, wherein the nominal pin is separate from the compensation pin, and wherein the nominal pin is inserted into the passage of the compensation pin.

16. The compound dowel according to claim 13, wherein the compensation pin is generated via additive manufacturing from one of nylon, polypropylene, and powdered metal.

17. The compound dowel according to claim 13, wherein:
- the indexing feature includes a plurality of snap-in prongs and the first component additionally defines a corresponding plurality of third apertures configured to accept the snap-in prongs; and
- the compensation pin is configured to be oriented and fixed to the first component by the plurality of snap-in prongs engaging and locking with the corresponding plurality of third apertures.

* * * * *